Figure 12:
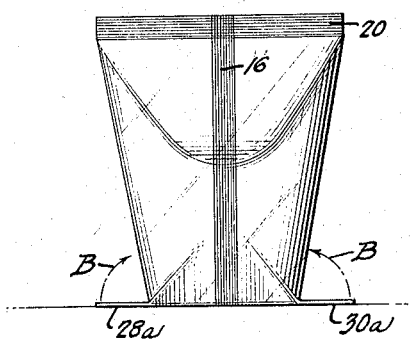

Nov. 1, 1966 W. N. JARDINE 3,282,411
FLEXIBLE PLASTIC CONTAINER
Original Filed March 25, 1959 4 Sheets-Sheet 1
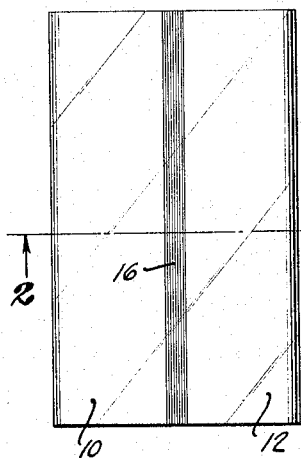
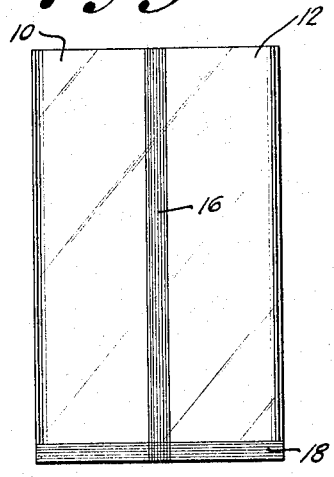
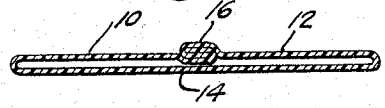
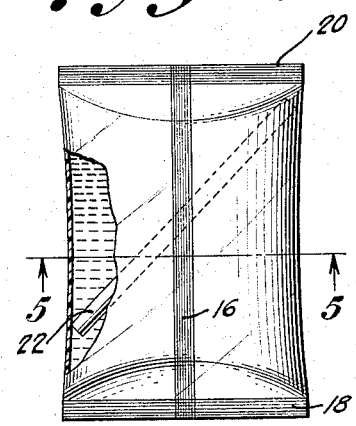
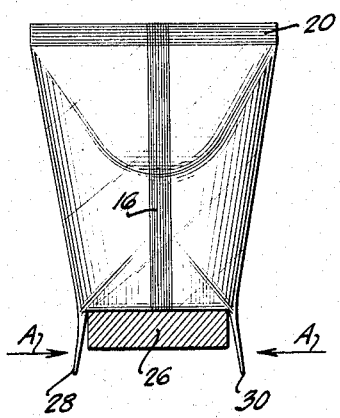
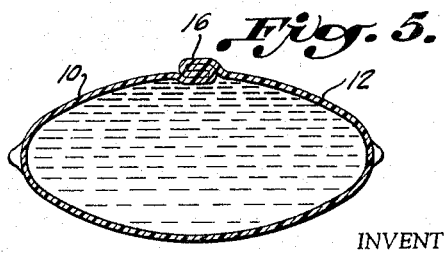
INVENTOR
WILLIAM N. JARDINE
BY Charles L. Sturtevant
ATTORNEY

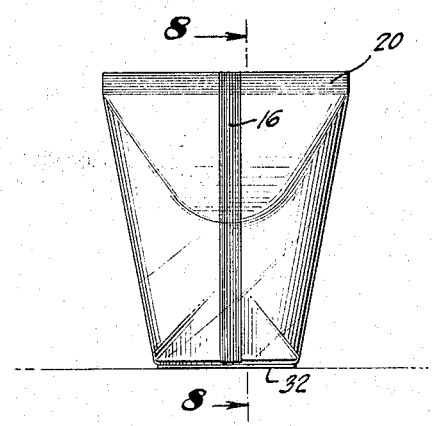
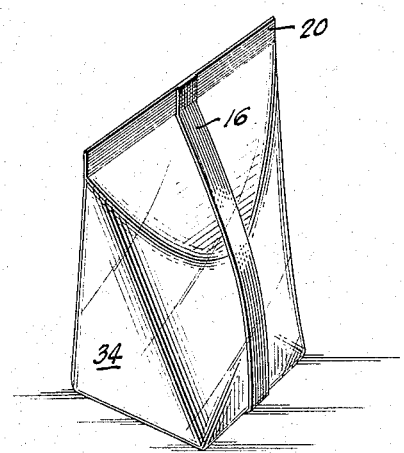
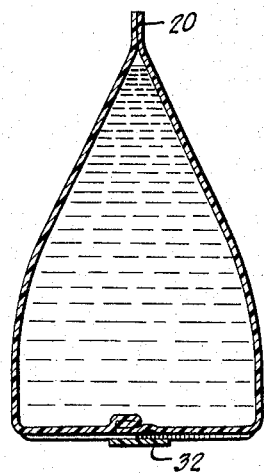
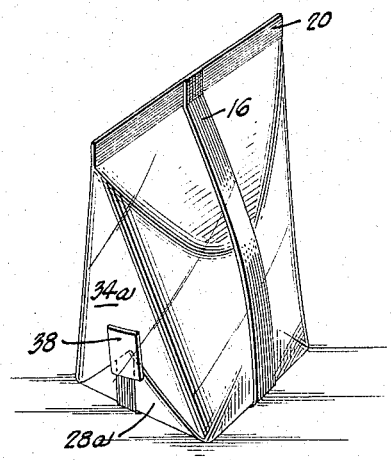
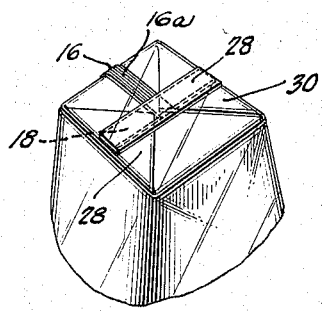

Nov. 1, 1966  W. N. JARDINE  3,282,411
FLEXIBLE PLASTIC CONTAINER
Original Filed March 25, 1959  4 Sheets-Sheet 3

INVENTOR
WILLIAM N. JARDINE

BY Charles L. Sturtevant
ATTORNEY

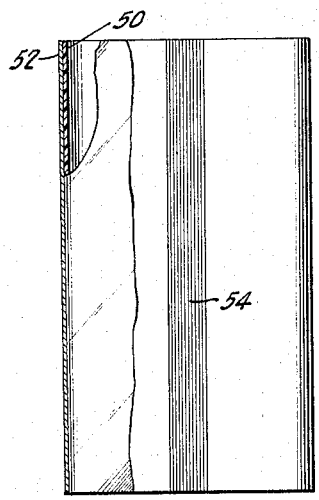
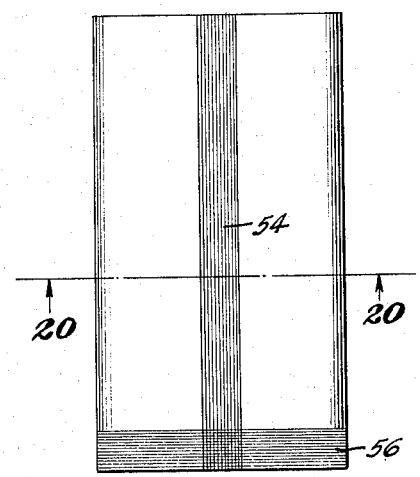
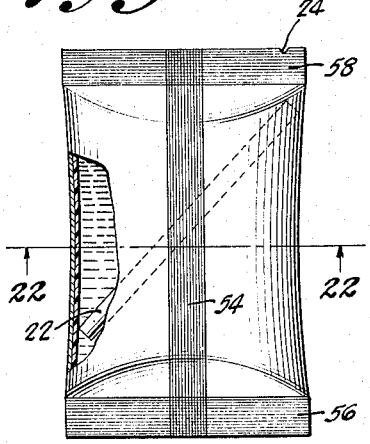
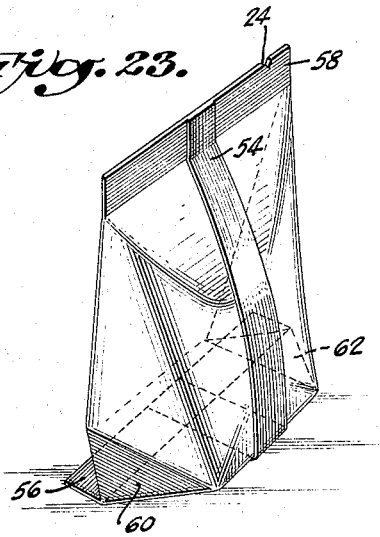
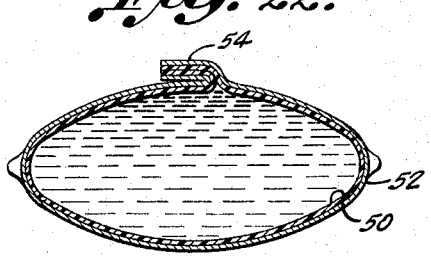

United States Patent Office 3,282,411
Patented Nov. 1, 1966

3,282,411
FLEXIBLE PLASTIC CONTAINER
William N. Jardine, % W. N. Jardine Co., P.O. Box 740,
Honolulu, Hawaii
Continuation of application Ser. No. 801,897, Mar. 25,
1959. This application Mar. 1, 1963, Ser. No. 264,998
13 Claims. (Cl. 206—46)

This application is a continuation of application Serial No. 801,897, filed March 25, 1959 and now abandoned.

The present invention relates to new and useful improvements in containers for fluent materials, and more particularly, to flexible wall containers for liquids and the like; and the invention further provides a method of forming such containers into package form; in particular the formation of one of the end structures of the container after it has been filled and sealed as a package.

In general, the invention contemplates the provision of a flexible wall "throw-away" container for liquids of various types, including beverages, syrups and the like, to be emptied or consumed therefrom. Preferably, the material is translucent or transparent and is selected from one of the commercially available plastics or laminates thereof which may be heat sealed and there are numerous examples of materials of this character such as polyethylene, Viscose Film PE, a combination viscose film and polyethylene film manufactured by Kalle & Company, Germany, and others. The container is first formed as a tube, either by extrusion or by folding and longitudinally seaming a flat blank; then sealed at one end and filled with the liquid or other fluent material contents; then sealed at the opposite end; and then further processed to form a bottom end structure presenting a relatively stable flat bottom surface under influence of the contents of the container so that the container can be supported in upright and substantially stable position on a table surface or like support.

An object of the present invention is to provide a flexible thin wall filled container having a bottom end structure serving to support the package in stable upright position on a supporting surface.

Another object of the invention is to provide a container substantially of the above type wherein the weight of the fluent contents acts on the walls of the container to preserve the supporting configuration of the bottom end structure.

A further object of the invention is to provide a container substantially of the above type wherein the bottom seam and a portion of the side seam add reinforcement and control to the bottom end structure.

A still further object of the present invention is to provide a container substantially of the above type, and particularly for liquids, and incorporating therein a dispensing straw of a preselected length to assume a position within the container free of the bottom end structure and readily accessible at the top of the container.

A still further object of the invention is to provide a container substantially of the above type which may be conveniently formed on automatic machinery.

A still further object of the invention is to provide a container substantially of the above type which is inherently soft and flexible as a "pillow" so that several containers may be easily interfitted with one another and packed in cartons.

The invention still further aims to provide a novel method of completing the formation of the bottom end structure of the container after it has been filled and sealed, with the contents acting on the walls of the container to assist in the formation of the bottom end structure.

The above and other objects of the invention will in part be obvious and will be hereinafter more fully pointed out.

Figure 13:
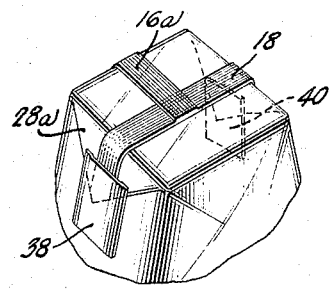
Figure 14:
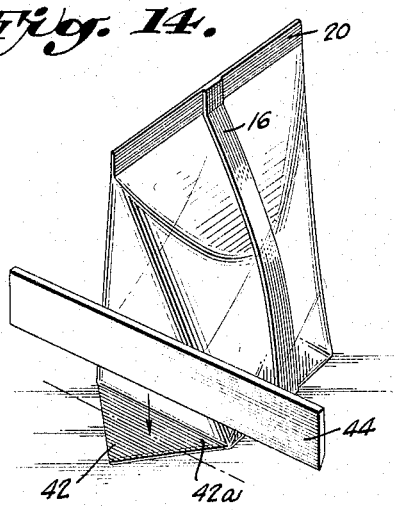
Figure 15:
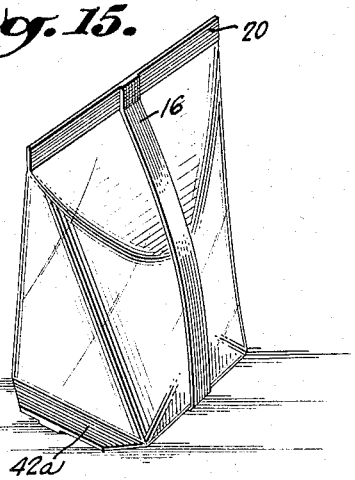
Figure 17:
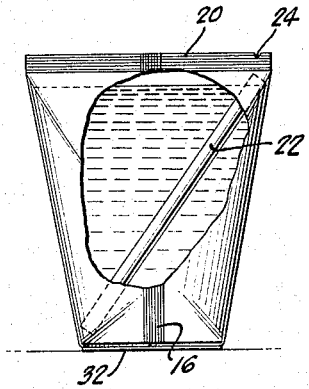
Figure 16:
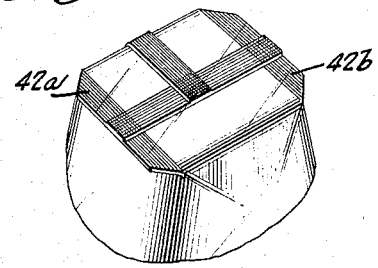

In the accompanying drawings:
FIG. 1 is a plan view of an initial tubing blank from which the container is formed;
FIG. 2 is an enlarged sectional view taken substantially along the line of 2—2 of FIG. 1 showing the reinforcing side seam of the original tubing;
FIG. 3 is a plan view showing the tubing with a closure seal applied at one end thereof;
FIG. 4 is a plan view showing the container, after filling thereof and insertion of a diagonal straw, and sealing of the opposite end thereof, to form a filled "pillow";
FIG. 5 is an enlarged sectional view taken substantially along the line 5—5 of FIG. 4;
FIG. 6 is a view showing the manner in which the "pillow" of FIG. 4 is positioned relative to a support to effect formation of the triangular end flaps or ears which are to be folded inwardly in the direction of the arrows to form the stabilizing end support;
FIG. 7 is a side elevation showing the completed container;
FIG. 8 is a slightly enlarged sectional view taken substantially along the line 8—8 in FIG. 7;
FIG. 9 is a fragmentary bottom perspective view showing the formation of the bottom end structure;
FIG. 10 is a perspective view showing the completed package of FIG. 7 resting in stable position on a supporting surface;
FIG. 11 is a perspective view, similar to FIG. 10, but showing a modified form of bottom end structure;
FIG. 12 is a side elevation showing the positioning of a filled "pillow" on a supporting surface to direct the triangular end flaps or ears outwardly for subsequent upward folding to the position of the filled container shown in FIG. 11;
FIG. 13 is a fragmentary perspective view showing the bottom end structure of the package of FIG. 11;
FIG. 14 is a perspective view showing a step in the formation of a modified form of package in which the end flaps are heat sealed and trimmed off to complete the bottom end structure;
FIG. 15 is a perspective view showing the completed package of FIG. 14;
FIG. 16 is a fragmentary perspective view showing the bottom end structure of the completed package of FIG. 15;
FIG. 17 is a side elevation of a completed package, with part thereof broken away, and showing the positioning within the package of a dispensing straw or the like;
FIG. 18 is a view similar to FIG. 1 showing the initial tubing in laminate form with a plastic inner layer and an outer layer of suitable material, as paper;
FIG. 19 is a plan view showing the tubing of FIG. 18 with a closure seal applied at one end thereof;
FIG. 20 is an enlarged sectional view taken along the line 20—20 of FIG. 19;
FIG. 21 is a plan view showing the container after filling thereof and insertion of a dispensing straw, and sealing of the oppposite end thereof, to form the filled "pillow";
FIG. 22 is a slightly enlarged section taken along the line 22—22 of FIG. 21; and
FIG. 23 is a perspective view showing the completed package with modified bottom end structure resting in stable position on a supporting surface.

Referring more in detail to the accompanying drawings, and particularly to FIGS. 1 through 10 at this time, one form of plastic container is shown, together with the method of forming the same. The completed container of this form of the invention is shown in its stable surface-supported position in FIG. 10 but to more clearly understand the completed structure thereof, reference is made to FIGS. 1 through 4, 6 and 7, illustrating the method of forming this type of container. The plastic material is formed into a flattened tube as shown in FIGS. 1 and 2. Though this tube may be formed as an extruded tube, it is illustrated as being formed from a flat sheet of plastic material, the portions 10, 12 of which are folded with respect to the opposite portion 14 and heat sealed along the edges to form the longitudinal seam 16. Preferably, the seam 16 is an interlocked double seam, rather than merely a lap seam, so as to lend additional stiffness and some rigidity and reinforcement to the completed package as will be hereinafter pointed out. After formation of the tube of FIGS. 1 and 2, the bottom end of the package is closed by heat sealing to form the transverse bottom seam 18. With the container thus far formed, it is filled through the open end with fluent material, usually liquid. If desired, a dispenser in the form of a straw 22 may be inserted before or after filling. The straw is illustrated in the "pillow" of FIG. 4 but since it may not be included in all packages, its illustration in a completed package is shown in FIG. 17. Then the open end of the tube is closed by heat sealing to form the transverse top seam 20. Thus, in FIGS. 4 and 5, the filled and sealed container is shown in the form of a flexible "pillow." The length of the straw is selected so that it can be positioned in the package with an end thereof readily accessible at the top of the completed package. For purposes of illustration, the length of the straw may be such that it is greater than the width of the package and also greater than the height of the completed package so that it will assume the illustrated trapped diagonal position of FIG. 17 with the upper end thereof located close to the top seam 20 for easy access. The length of the straw is also such that during formation of the bottom of the "pillow" into the bottom structure of the completed package, as for instance, FIG. 17, it will be free to move clear of any deformation or folding of the flaps and bottom as the bottom structure is being formed. If the straw is formed of buoyant material, the contained liquid will tend to maintain the straw within the "pillow" in the position of FIG. 4 with the lower end thereof clear of any interference with subsequent formation of the bottom structure of the container and so that the upper end of the straw will be readily accessible upon removal of a top corner of the package, as by ripping the seam 20 at the notch 24 (FIG. 17).

After formation of the filled and sealed "pillow" of FIG. 4, the container is positioned on a supporting surface 26 for relative movement with respect thereto and this may be accomplished by merely resting the filled container on the support 26 so that the weight of the contents will effect the desired formation of the bottom. The support 26 has a width somewhat less than the length of the bottom seam 18, preferably about two-thirds of its length. As shown in FIG. 6, when the filled "pillow" rests upon the support 26, the bottom seam 18 will be turned to a horizontal position and end flaps or ears 28, 30, will be formed and directed downwardly over the sides of the support 26 in which position, the material of the flaps will be forced together to substantially completely expel the material out of the ears and into the body of the container. Then, the flaps 28, 30 are bent or forced inwardly, as indicated by the arrows A with simultaneous removal of the support 26. When the ears are folded inwardly to lie along the thus flattened and substantially squared bottom, they may be secured in that position in any suitable manner, as for instance by a separate sealing strip 32 which is adhered in suitable manner across the inturned flaps, as illustrated in FIGS. 7, 8 and 9.

Thus, the completed package of this form of the invention includes the longitudinal side seam 16, the top and bottom closing heat sealed seams 20, 18 and some means for securing the bottom triangular flaps or ears against the bottom of the package, such as the adhered strip 32. The bottom of the package is substantially squared and is reinforced by the bottom seam 18 and the inwardly directed portion 16a of the longitudinal side seam 16, as well as the securing strip for the folded bottom triangular flaps. Heat sealing to provide the seams 16, 18 and 20 serves to add stiffness to the material in those regions. Thus, in the completed package of FIG. 10, the top seam 20 maintains its transverse and substantially vertical disposition; the side seam 16 adds stiffness to the body of the package; and the transverse flattened bottom seam 18 traverses the end flaps and adds stiffness across the bottom of the container. Likewise, the inturned portion 16a of the side seam 16, as shown in FIG. 9, adds further stiffness to the substantially squared bottom of the package. Thus, the flattened bottom is more or less confined by the folded edge of the flaps 28, 30 where they join the body wall and also by the side seam 16 and its underneath continuation 16a, and additional stiffness is added by the end flaps 28, 30 and the flattened bottom seam 18 so that the wall 14 of the container is more or less controlled by the flattened bottom which, in turn, is maintained in that position by the weight of the contained liquid or other fluent material when the package is supported as in FIG. 10. The package is thus supported on its squared bottom surface in the substantially stable position of FIG. 10, and as indicated above, the side seam 16 serves as a form of reinforcement or stiffening means to maintain the body portion of the container in upright and stable position with the end walls 34 assuming a generally triangular shape. The weight of the contents serves to maintain the bottom in its squared and surface-engaging position and, as pointed out above, the weight of the filled "pillow" on the supporting surface 26 tends to relatively shift the contacted bottom of the "pillow" so that the triangular end flaps or ears automatically assume the position of FIG. 6 to enable them to be bent inwardly along the bottom of the container as indicated by the directional arrows of FIG. 6.

In FIG. 11, there is shown a modified form of package which is essentially similar to the package previously described with the exception of the supporting bottom end formation. In other words, this package is formed in the manner of the previously described package up to the filled "pillow" of FIG. 4. Then, the "pillow" is supported on a rigid supporting surface, as shown in FIG. 12, so that the triangular end flaps or ears 28a, 30a will be directed outwardly under influence of the weight of the contents with the contents substantially completely expelled therefrom and with the bottom seam 18 assuming a horizontal position. In this position of the package, the end flaps 28a, 30a are turned upwardly in the direction of the arrows B to a position against the side walls 34a of the package. In this upwardly folded position of the triangular end flaps, the flaps may be secured in any suitable manner as by the securing strip of FIG. 9 continued for a short distance of the end walls, or by separate securing strips 38, 40, one for each upwardly folded triangular flap, as shown in FIG. 13. Here again, the bottom seam 18 and the adjacent portion of the side seam 16 lend reinforcement and stiffness to the squared bottom end structure and with the weight of the contents enable the package to rest in the stable upright position on a suitable support as shown in FIG. 11.

Another form of package is shown in FIG. 15. This package is also formed in the manner of the first-described package up to the filled "pillow" of FIG. 4. Thereafter, the filled "pillow" is placed on a supporting surface as shown in FIG. 14, this being similar to the positioning of the "pillow" in FIG. 12, and in this position of the "pillow" the triangular end flaps 42 will also be directed outwardly with the contents substantially completely expelled therefrom. With the triangular end flaps in this outwardly directed position, the surfaces of the end flaps are each heat sealed throughout their surface extents. Then, as diagrammatically illustrated by the cutting element 44 in FIG. 14, the outer corner portions of the triangular end flaps are trimmed off to leave outwardly directed horizontal portions 42a, 42b, as illustrated in FIG. 16. It will thus be seen that the bottom closing seam 18 extends across the outwardly directed remainder of the flap portions 42a, 42b to assist in maintaining them in true horizontal position and with some degree of stiffness so that, in fact, the squared bottom end of the container of FIG. 15 is enlarged by reason of the flap portions 42a, 42b to give additional stable support to the filled package, it being understood, too, that the heat sealing of the flaps adds stiffness thereto.

In FIG. 17, there is illustrated the package of FIG. 10 but it is to be understood that this form of the invention may be utilized with any of the previously described forms of packages. In this modification, there is inserted a straw 22 or other dispensing element into the package before the top closing seam 20 is formed as previously suggested in connection with FIG. 4. That is, this straw or other dispensing element is inserted into the open-ended package either before, during, or after filling thereof with the contents, and thereafter the top closing seam 20 is formed. Thus, the "pillow" of FIG. 4 would have positioned therein the inserted straw of such length that it will not interfere with the subsequent formation of the bottom end structure and further so that it will maintain its diagonal position in the completed package, as shown in FIG. 17. The corner of the top closing seam 20 may be scored or otherwise weakened, as at 24, to permit this small portion to be ripped from the filled package so that access can be had to the adjacent end of the straw which, if formed of buoyant material, will tend to float upwardly for projection through the opening thus formed. The user can then manipulate the exposed end of the straw to an elevated position from which the contents of the package may be sipped.

In FIGS. 18 through 23, there is shown another form of package wherein the wall is a multiply arrangement, not necessarily laminated or secured throughout the extent thereof. The tube of FIG. 18 is formed from sheets of a plastic material 50 and an outer ply 52 which may be any suitable form of paper or other material. The edges of the sheets are secured together by a heat sealed seam 54. As in the previous forms of the invention the tube is then provided with a heat sealed bottom seam 56 after which the tube of FIG. 19 is filled and a straw 22 may be included. Then the top heat sealed seam 58 is formed so as to complete the "pillow" of FIG. 21. Upon placement of this "pillow" on a flat supporting surface as in FIG. 23, the bottom seam 56 is turned to a substantially horizontal position and the end outwardly projecting flaps 60, 62 result from the weight of the liquid within the package. These end flaps 60, 62 are then themselves heat sealed, in the manner suggested in the form of the invention shown in FIG. 15, which results in a relatively stiff flat bottom extended laterally of the package by the flaps 60, 62. In forming this type of package, the heat sealing to effect the seams and the flaps 60, 62, particularly when paper is used with polyethylene or similar plastic liner, more or less boils the polyethylene so that it is intimately impregnated into the adjacent paper layer so that a very strong and relatively stiff homogeneous seal is effected. In fact, the stiffness of the completed package of FIG. 23 is such that it may be manipulated by hand for drinking directly therefrom, if desired.

From the foregoing description, it will be appreciated that the present invention provides a novel container of flexible plastic material and resulting filled package originally in substantially tubular form with transverse top and bottom closing seams which are formed under heat and pressure to add some stiffness to the ends of the filled pillow-like package. The bottom seam is turned to a substantially horizontal position when the pillow-like structure is placed on a support during ultimate formation of the bottom so that the weight of the contents, or added relative force applied between the package and support, displaces at least a portion of the bottom end of the package toward the top end thereof to form a flattened bottom area as a result of which end flaps are automatically formed to project at an angle from the flattened area. During such formation of the end flaps, the contained fluid material will be forced from between the layers of the end flaps and into the body of the material so that these end flaps as flat triangular flaps, can then be further processed to add stability and peripheral confinement to the formed flattened bottom area as for instance, by folding the flaps inwardly and securing the same across the bottom to form the package of FIG. 10; or by folding the flaps upwardly for securing to the end walls of the package of FIG. 11; or by further heat and pressure sealing and uniting the material of the laterally extending flaps, as in FIGS. 14 and 23. In all forms of the invention, the bottom is maintained in substantially flat condition and the weight of the contents when the package is placed on a supporting surface assists in the maintenance of the bottom in its flattened condition for supporting the package in stable upright position. In the packages of the various forms of the invention, the top closing seam tends to maintain its transverse integrity and where a side seam is employed, this side seam adds to the stiffness of the package which, in supported upright position, assumes an end configuration which is somewhat triangular as evidenced by the thusly shaped end walls 34. As previously pointed out, the body of the package remains highly flexible so that the packages can be closely and conveniently packed in mutually interfitting flexible relationship. However, even though the bottom may be deformed in such packaging, nevertheless, it will resume its flat supporting area upon placement of the package on a supporting surface. This is accomplished not only by the weight of the contents but also because of the function of the end flaps and the inturned side seam, as well as the bottom seam, tending to maintain a more or less definite periphery to the bottom end structure. In other words, the weight of the contents does not cause the package to inertly "flow" on a supporting surface because the bottom supporting area of the package is well defined in the manner set forth above.

While certain forms of the invention have been shown for purposes of illustration, it is to be clearly understood that various changes in the details of construction may be made, and also changes in the method of forming the packages, without departing from the spirit and scope of the invention as set forth in the appended claims.

I claim:

1. A flexible plastic container filled with fluent material contents, such as liquids and the like, and adapted to be supported in stable upright position on a supporting surface; and comprising a flexible body portion transversely seamed at the top and bottom ends thereof to confine the contents, the bottom end including opposed end flaps and a flattened central supporting area displaced toward and of lesser longitudinal extent than the top of the body portion and confined between said end flaps disposed in positions not substantially below coincidence with the plane of the flattened central area and with the bottom seam in face-to-face contact with the end flaps and the flattened central area and extending across the flattened area and the end flaps to add stiffness tending to maintain the confined central area in its flattened condition, said body portion providing two opposed faces decreasing in width and two opposed faces increasing in width as they approach one of the transverse seams.

2. A flexible plastic container as claimed in claim 1, wherein the body portion includes a longitudinal side seam with the lower end thereof directed across the adjacent portion of the flattened central area to additionally confine the same.

3. A flexible plastic container as claimed in claim 1, wherein the end flaps are folded inwardly and secured beneath the central flattened area.

4. A self-supporting and sealed liquid filled container formed from a tubular pillow-like structure of inherently flexible plastic material, and having at one end a bottom transversely flattened throughout a substantial portion thereof but within the opposite longitudinal end margins reducing the longitudinal extent of the liquid supporting bottom to less than the longitudinal extent of the opposite end of the container and forming opposite end flaps from which the contained liquid has been substantially completely expelled into the body of the container upon flattening of the bottom, said end flaps being secured in positions not substantially below coincidence with the plane of the flattened bottom tending to maintain the integrity of the flattened bottom without interfering with the stable self-support of the container on the flattened bottom, said container providing two opposed faces decreasing in width and two opposed faces increasing in width as they approach the end of the container opposite to said bottom.

5. A liquid filled package comprising a thin-walled and flexible plastic body portion originally in substantially tubular form with transverse top and bottom end closing seams forming a pillow-like structure, the bottom of the package having opposed end flaps including the transverse bottom seam extending thereacross and formed upon association of the pillow-like structure with a relatively rigid support and effecting an intermediate substantially flat bottom supporting area displaced toward and of lesser longitudinal extent than the top closing seam with the end flaps folded inwardly and secured together in underlying relationship with respect to the bottom area and disposed not substantially below coincidence with the plane of the flat bottom supporting area and maintained as such under the mutual influence of the end flaps, the transverse bottom seam, and reaction weight of the contained liquid in supporting the package in stable upright position on a supporting surface.

6. The method of filling a flexible plastic container with fluent material and closing the container; which method comprises forming a substantially tubular body, sealing the bottom end of the tubular body, substantially filling the tubular body with fluent material, sealing the top end of the tubular body, relatively displacing at least a portion of the bottom end of the filled tubular body toward the top end thereof under influence of the weight of the fluent material to flatten the displaced portion and form end flaps at opposite ends of the flattened displaced portion, and folding the end flaps inwardly in secure position underlying the flattened displaced portion to stabilize and confine the flattened displaced portion on which the filled container is adapted to rest in stable upright position on a supporting surface.

7. The method of filling a flexible plastic container with fluent material and closing the container; which method comprises forming a substantially tubular body, sealing the bottom end of the tubular body, substantially filling the tubular body with fluent material, sealing the top end of the tubular body, relatively displacing at least a portion of the bottom end of the filled tubular body toward the top end thereof under influence of the weight of the fluent material to flatten the displaced portion and form end flaps at opposite ends of the flattened displaced portion, and folding the flaps upwardly and securing the same to adjacent side walls of the tubular body to stabilize and confine the flattened displaced portion on which the filled container is adapted to rest in stable upright position on a supporting surface.

8. The method of filling a flexible plastic container with fluent material and closing the container; which method comprises forming a substantially tubular body, sealing the bottom end of the tubular body, substantially filling the tubular body with fluent material, sealing the top end of the tubular body, relatively displacing at least a portion of the bottom end of the filled tubular body toward the top end thereof under influence of the weight of the fluent material to flatten the displaced portion and form end flaps at opposite ends of the flattened displaced portion, and directing the flaps radially outwardly and uniting by heat sealing the layers of the material thereof to form lateral extensions of the flattened displaced portion to stabilize and confine the flattened disposed portion on which the filled container is adapted to rest in stable upright position on a supporting surface.

9. The method of completing the formation of the bottom end structure of a sealed container filled with fluent material; which method comprises supporting a substantial portion of the bottom end structure of the sealed and filled container substantially centrally and within opposite end margins thereof to form a flattened portion displaced toward the top of the container and depending end flaps under influence of the weight of the contents, and folding the end flaps inwardly to underlie the flattened displaced portion to stabilize and confine the same.

10. The method of completing the formation of the bottom end structure of a sealed container filled with fluent material; which method comprises supporting the bottom end structure of the sealed and filled container throughout its transverse extent to form a flattened portion displaced toward the top of the container with the end flaps extending outwardly and in the plane of the flattened displaced portion under influence of the weight of the contents to stabilize and confine the flattened displaced portion.

11. The method of claim 10, wherein the end flaps are folded upwardly and secured to the adjacent side walls of the container.

12. The method of claim 10, wherein the material of the end flaps is united by heat sealing to form a relatively stiffer extension of the flattened displaced portion.

13. The method of completing the formation of the bottom end structure of a sealed container filled with fluent material with the bottom end structure including a transverse sealing seam originally displaced at right angles toward the filled container; which method comprises supporting a substantial portion of the bottom end structure of the sealed and filled container within opposite end margins thereof to form a flattened portion displaced toward the top of the container and angularly disposed end flaps under influence of the weight of the contents and with the transverse sealing seam turned to a substantially horizontal position, and further processing the angularly disposed end flaps to stabilize and confine the flattened displaced portion.

References Cited by the Examiner
UNITED STATES PATENTS

| | | | |
|---|---|---|---|
| D. 173,933 | 2/1955 | Cargill | 229—53 |
| 2,154,083 | 4/1939 | Bergstein | 229—53 |
| 2,203,591 | 6/1940 | Brown | 229—3.1 |
| 2,232,088 | 2/1941 | Waters | 229—61 |
| 2,481,380 | 9/1949 | Anderson | 229—14 |
| 2,597,305 | 5/1952 | Doyle | 229—53 |
| 2,669,351 | 2/1954 | Carson et al. | 229—14 |
| 2,718,105 | 9/1955 | Ferguson et al. | 229—57 |
| 2,779,462 | 1/1957 | Hoag | 206—46 |
| 2,821,337 | 1/1958 | Morgan | 229—61 |
| 2,849,321 | 8/1958 | Lhermitte et al. | 229—7 |
| 2,861,718 | 11/1958 | Winzen | 229—14 X |
| 3,003,681 | 10/1961 | Orsini | 229—57 |

THERON E. CONDON, *Primary Examiner.*

R. H. SCHWARTZ, *Assistant Examiner.*